United States Patent
Luo et al.

(10) Patent No.: US 7,700,213 B2
(45) Date of Patent: Apr. 20, 2010

(54) LIQUID-GAS SEPARATOR FOR DIRECT LIQUID FEED FUEL CELL

(75) Inventors: Xiaobing Luo, Yongin-si (KR); Sang-kyun Kang, Seoul (KR); Do-young Seung, Seoul (KR)

(73) Assignee: Samsung SDI Co., Ltd., Suwon-si (KR)

( * ) Notice: Subject to any disclaimer, the term of this patent is extended or adjusted under 35 U.S.C. 154(b) by 956 days.

(21) Appl. No.: 11/445,332

(22) Filed: Jun. 2, 2006

(65) Prior Publication Data
US 2007/0003809 A1      Jan. 4, 2007

(30) Foreign Application Priority Data
Jun. 30, 2005     (KR) .................. 10-2005-0058800

(51) Int. Cl.
*H01M 8/04* (2006.01)
*B01D 63/00* (2006.01)
(52) U.S. Cl. .................. 429/34; 55/529; 96/6; 96/7
(58) Field of Classification Search .............. 96/6, 96/7, 187; 55/529; 210/538; 429/34
See application file for complete search history.

(56) References Cited

U.S. PATENT DOCUMENTS

| | | | |
|---|---|---|---|
| 3,206,938 A * | 9/1965 | Damsz | 62/49.2 |
| 4,898,030 A * | 2/1990 | Yeh | 96/187 X |
| 7,279,031 B1 * | 10/2007 | Wright | 96/6 X |
| 2003/0059659 A1 | 3/2003 | Kamo et al. | 429/32 |

FOREIGN PATENT DOCUMENTS

| | | |
|---|---|---|
| CN | 1532975 | 9/2004 |
| CN | 1612393 | 5/2005 |
| JP | 2003-317773 | 11/2003 |
| JP | 2004-186151 | 7/2004 |
| JP | 2004-206917 | 7/2004 |
| WO | WO 02/23661 | 3/2002 |

* cited by examiner

*Primary Examiner*—Stephen J. Kalafut
(74) *Attorney, Agent, or Firm*—Stein McEwen, LLP

(57) ABSTRACT

Provided is a liquid-gas separator of a direct liquid feed fuel cell. The liquid-gas separator includes an empty ball shaped main body; a gas extraction membrane which is attached to an opening formed in the main body, and selectively extracts gas from the main body; an inlet which is formed in the main body and guides the liquid and gas into the main body; an outlet which is formed on the main body and guides the liquid to the outside of the main body; and a flexible tube having a hollow structure, one end of which is connected to the outlet and the other end of which is immersed in the liquid fuel.

19 Claims, 5 Drawing Sheets

FIG. 1 (PRIOR ART)
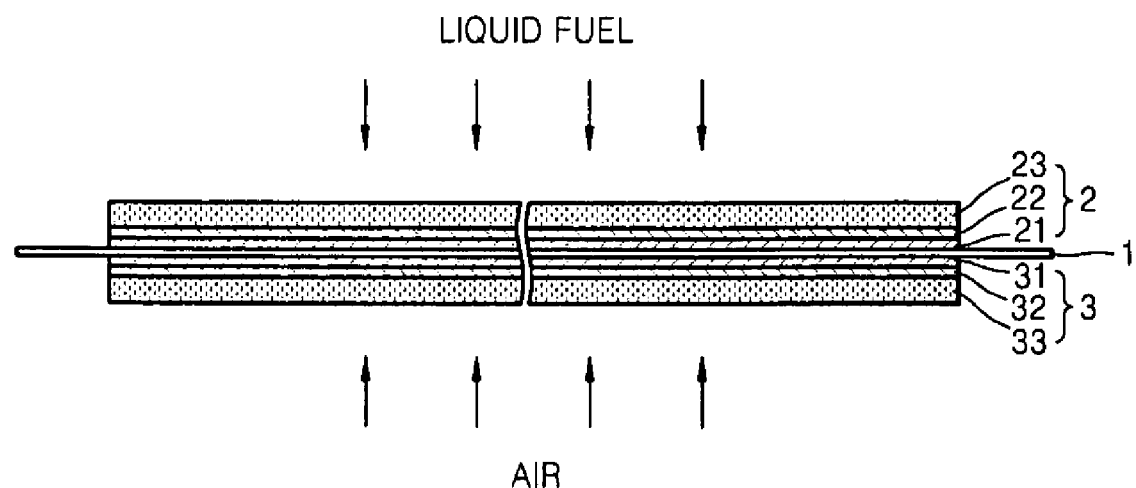
FIG. 2A (PRIOR ART)
FIG. 2B (PRIOR ART)
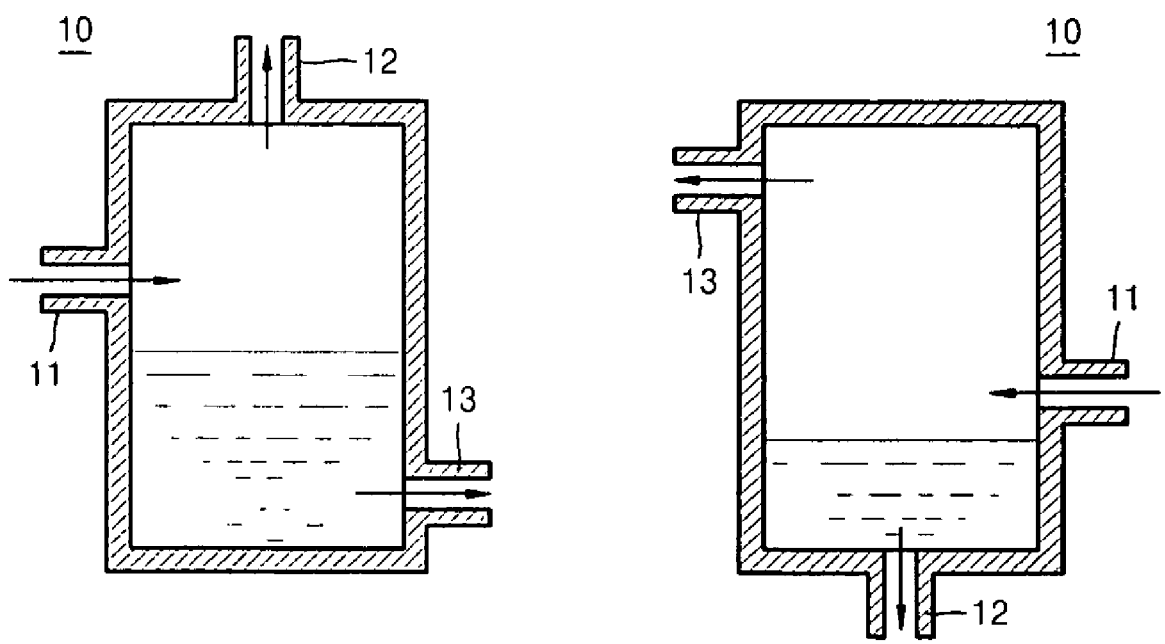

US 7,700,213 B2

LIQUID-GAS SEPARATOR FOR DIRECT LIQUID FEED FUEL CELL

CROSS-REFERENCE TO RELATED APPLICATION

This application claims the benefit of Korean Application No. 2005-58800, filed Jun. 30, 2005, in the Korean Intellectual Property Office, the entire disclosure of which is incorporated herein by reference.

BACKGROUND OF THE INVENTION

1. Field of the Invention

Aspects of the present invention relate to a liquid-gas separator to segregate carbon dioxide from unreacted liquid fuel discharged from an anode electrode of a direct liquid feed fuel cell.

2. Description of the Related Art

A direct liquid feed fuel cell is an apparatus that generates electricity by an electrochemical reaction between an organic fuel, such as methanol or ethanol, and an oxidant, for example, oxygen. The electricity generated by the direct liquid feed fuel cell has a high specific energy density and power density. Also, since a liquid fuel, for example, methanol, is fed directly to the cell, the direct feed fuel cell does not require a peripheral device, such as a fuel reformer, and storing and supplying of the liquid fuel is easy.

As depicted in FIG. 1, the direct feed fuel cell has a structure that an electrolyte membrane 1 is interposed between an anode electrode 2 and a cathode electrode 3. The anode electrode 2 includes a diffusion layer 22 for supplying and diffusing fuel, a catalyst layer 21 at which an oxidation reaction of the fuel occurs, and an electrode supporting layer 23. The cathode electrode 3 also includes a diffusion layer 32 for supplying and diffusing the fuel, a catalyst layer 31 at which a reduction reaction occurs, and an electrode supporting layer 33. The catalyst for generating the electrode reaction is formed of a precious metal, such as platinum, having superior catalytic characteristics at low temperatures. Alternately, to avoid catalyst poisoning by CO, which is a by-product from the electrode reaction, a transition metal alloy catalyst, comprising ruthenium, rhodium, osmium, or nickel can be used. The electrode supporting layers 23 and 33 can be made of waterproofed carbon paper or waterproofed carbon fiber for easily supplying fuel and discharging reaction products. The electrolyte membrane 1 is a hydrogen ion exchange membrane having ion conductivity and containing moisture, and is formed of a polymer membrane having a thickness of 50~200 μm.

An electrode reaction of a direct methanol fuel cell (DMFC), which is a type of direct liquid feed fuel cell, includes an anode reaction where fuel is oxidized, and a cathode reaction where hydrogen and oxygen are reduced, as described below.

$CH_3OH + H_2O \rightarrow CO_2 + 6H^+ + 6e^-$ (Anode reaction)   [Reaction 1]

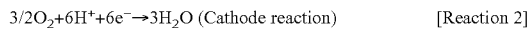
$3/2 O_2 + 6H^+ + 6e^- \rightarrow 3H_2O$ (Cathode reaction)   [Reaction 2]

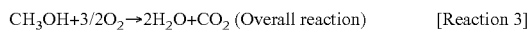
$CH_3OH + 3/2 O_2 \rightarrow 2H_2O + CO_2$ (Overall reaction)   [Reaction 3]

Carbon dioxide, hydrogen ions, and electrons are produced at the anode electrode 2 where the fuel is oxidized (reaction 1). The hydrogen ions migrate to the cathode electrode 3 through a hydrogen ion exchange membrane 1. Water is produced by the reduction reaction between hydrogen ions, electrons transferred from an external circuit, and oxygen at the cathode electrode 3 (reaction 2). Accordingly, water and carbon dioxide are produced as the result of the overall electrochemical reaction (reaction 3) between methanol and oxygen. At this time, two moles of water are produced when one mole of methanol reacts with oxygen.

The liquid fuel used in the fuel cell may not be pure methanol, but may be methanol mixed with water produced in the system or already stored in the fuel cell system. When a fuel of high concentration is used, the performance of the fuel cell is greatly reduced due to crossover of the fuel through the electrolyte membrane (hydrogen ion exchange membrane). Therefore, methanol diluted to a low concentration, such as 0.5 to 2 M (2 to 8 volume %), is generally used.

FIGS. 2A and 2B are cross-sectional views of a liquid-gas separator used for a fuel cell. The position of the liquid-gas separator 10 for a mobile fuel cell is not fixed at one position. At a normal position (FIG. 2A), unreacted fuel and carbon dioxide enter the liquid-gas separator 10 through an inlet 11. Carbon dioxide is exhausted into the air through a hole 12 formed on a ceiling of a liquid-gas separator body, and the unreacted fuel is recovered to the fuel cell through an outlet 13 formed on the lower part of the liquid-gas separator body.

However, in a reversed position (FIG. 2B) of the liquid-gas separator 10, the outlets 12 and 13 of the unreacted fuel and carbon dioxide are inverted. Accordingly, carbon dioxide may enter the anode electrode, and the unreacted fuel can be discharged to the outside.

SUMMARY OF THE INVENTION

Aspects of the present invention provide a liquid-gas separator that separates a liquid fuel from a gas regardless of the position of the liquid-gas separator, and a direct liquid feed fuel cell having the liquid-gas separator.

According to an aspect of the present invention, there is provided a liquid-gas separator that receives a liquid and gas mixture from the direct liquid feed fuel cell and separates the liquid from the gas, comprising: a hollow ball shaped main body; a gas extraction membrane which is attached on an opening formed in the main body, and selectively extracts gas from the main body; an inlet which is formed in the main body and guides the liquid and gas mixture into the main body; an outlet which is formed in the main body and guides the liquid to the outside of the main body; and a flexible tube having a hollow structure, one end of which is connected to the outlet and the other end of which is immersed in the liquid fuel.

According to an aspect of the present invention, the gas extraction membranes and corresponding openings in the main body may be formed at least at locations corresponding to apexes of a regular polyhedron that contact the outer surface of the main body. The regular polyhedron may be a regular tetrahedron. The gas extraction membrane may be formed of polytetrafluoroethylene (PTFE).

According to an aspect of the present invention, the liquid-gas separator may further comprise a weight installed at the other end of the flexible tube from the end connected to the outlet. The specific gravity of the weight may be greater than 1. The length of the flexible tube may be substantially the same as the diameter of the main body.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 1 is a cross-sectional view of the basic configuration of a direct liquid feed fuel cell;

FIGS. 2A and 2B are cross-sectional views of a liquid-gas separator used for a fuel cell;

DETAILED DESCRIPTION OF THE EMBODIMENTS

Figure 3:
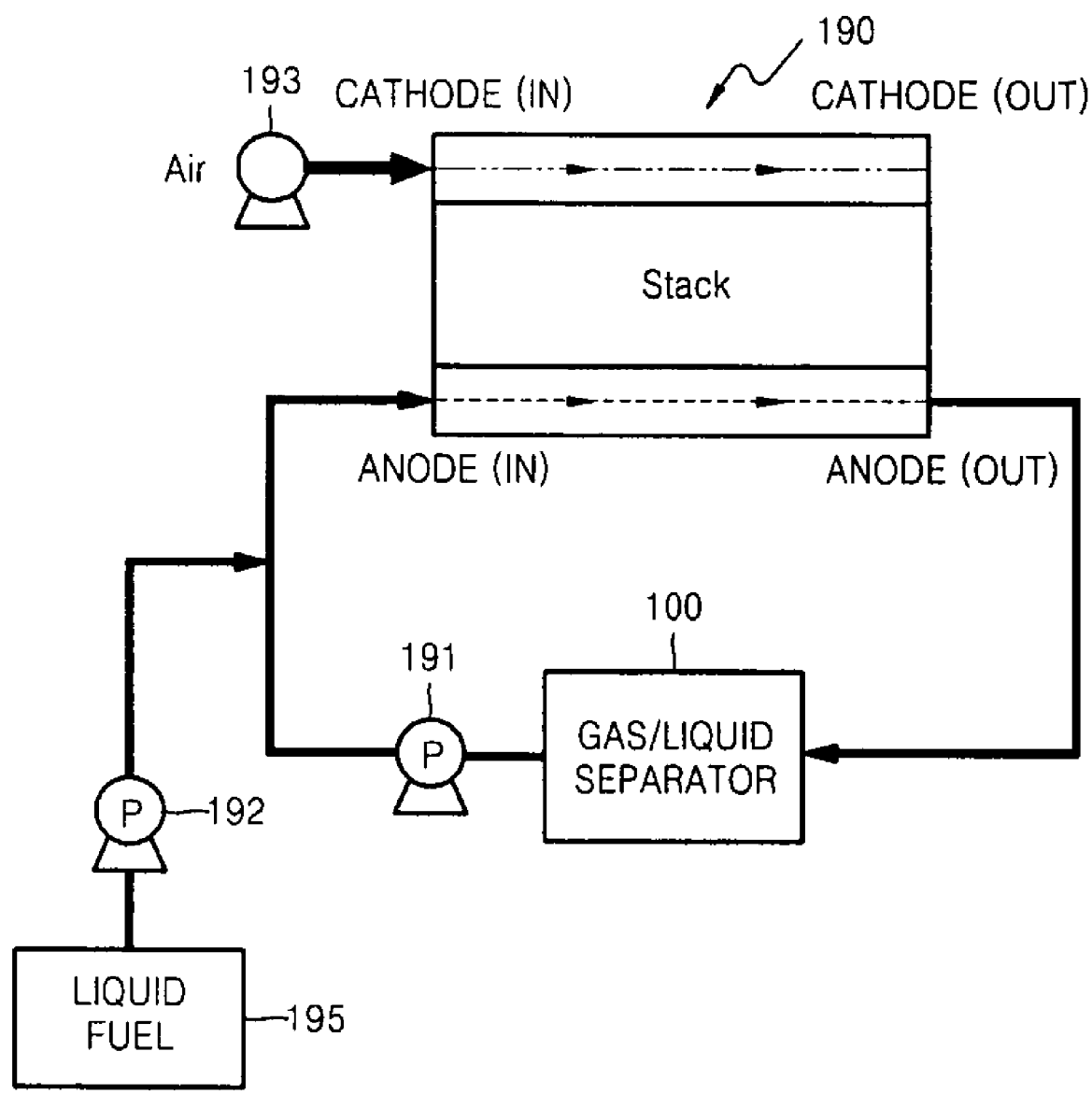
FIG. 3 is a schematic drawing of the conceptual configuration of a direct liquid feed fuel cell system having a liquid-gas separator according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 3 is a schematic drawing of the conceptual configuration of a direct liquid feed fuel cell system having a liquid-gas separator according to an embodiment of the present invention.

Referring to FIG. 3, a direct liquid feed fuel cell system includes a direct liquid feed fuel cell, such as a fuel cell stack 190, a liquid-gas separator 100 that exhausts carbon dioxide into the atmosphere and delivers liquid fuel to an anode using a water pump 191, after receiving diluted unreacted liquid fuel and carbon dioxide which is a product from an electrochemical reaction, a water pump 192 that conveys the diluted liquid fuel (for example, methanol) from a fuel tank 195 to the fuel cell stack 190, and a blower 193 that supplies air to the fuel cell stack 190. Water produced at a cathode electrode is discharged or can be circulated to the liquid-gas separator 100 or the fuel tank 195.

Figure 4:
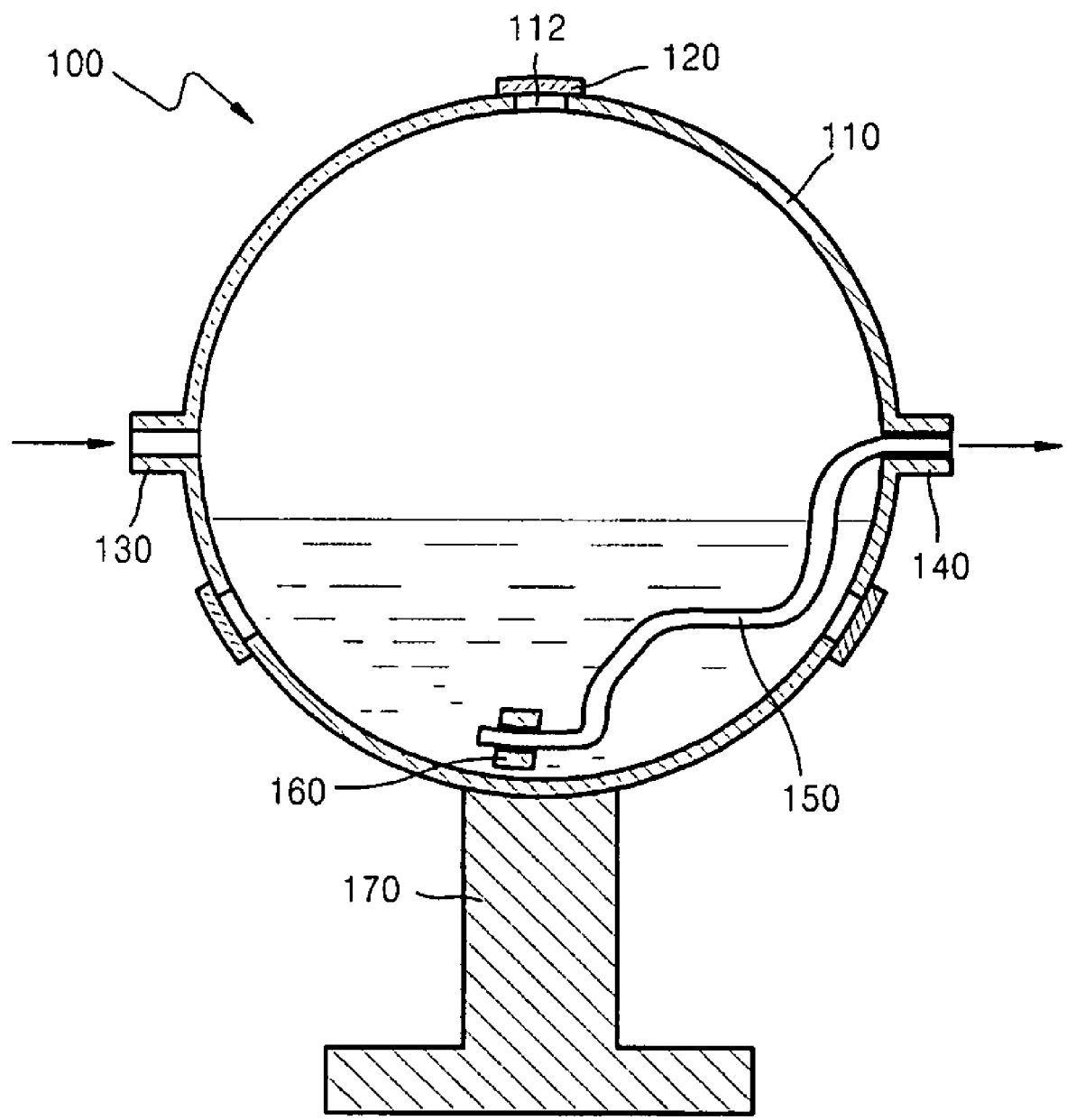
FIG. 4 is a cross-sectional view of a liquid-gas separator according to an embodiment of the present invention.

FIG. 4 is a cross-sectional view of the liquid-gas separator 100 according to an embodiment of the present invention.

Referring to FIG. 4, an empty ball shaped main body 110 includes an inlet 130 and an outlet 140 facing the inlet 130. The inlet 130 guides unreacted liquid fuel discharged from an anode electrode of a direct liquid feed fuel cell and carbon dioxide which is a reaction product, into the main body 110. The outlet 140 guides the liquid fuel to circulate in the fuel cell. A plurality of openings 112 are formed in the main body 110 and gas extracting membranes 120 that selectively extract gas are mounted on each opening 112. A flexible tube 150 having a hollow structure is installed in the main body 110. The flexible tube 150 has one end connected to the outlet 140 and the other end contacting the liquid fuel within the main body 110. Reference numeral 170 is a supporter that supports the main body 110, and can be used for fixing the main body to a fuel cell system.

The openings 112 may be formed at least on locations corresponding to apexes of a regular polyhedron, for example, a regular tetrahedron having apexes contacting the outer surface of the main body 110. In this configuration, at least one opening 112 corresponding to one apex is not covered by the liquid fuel in the main body 110 at any time, even if the liquid-gas separator 100 is rotated. Accordingly, the gas in the main body 110 is extracted through the gas extracting membrane 120 and separated from the liquid fuel.

The gas extracting membrane 120 can be formed of a hydrophobic porous material, such as polytetrafluoroethylene (PTFE) (commercial name TEFLON). The gas extracting membrane 120 may be shaped by pressing the PTFE with a porous reinforcing member (not shown) such as a porous cloth. The gas extracting membrane 120 prevents the discharge of the liquid fuel from the main body 110 and allows the exhausting of carbon dioxide gas.

The flexible tube 150 may be formed of rubber, and may have a length approximately equal to the diameter of the main body 110. A weight 160 having a specific gravity of greater than 1 is installed on the other end of the flexible tube 150. The majority of the liquid entering the main body 110 is water, and the specific gravity of methanol is 0.79. Therefore, the liquid entering the main body 110 has a specific gravity of less than 1. Accordingly, the other end of the flexible tube 150 is immersed in the liquid fuel by the weight 160.

Figure 5:
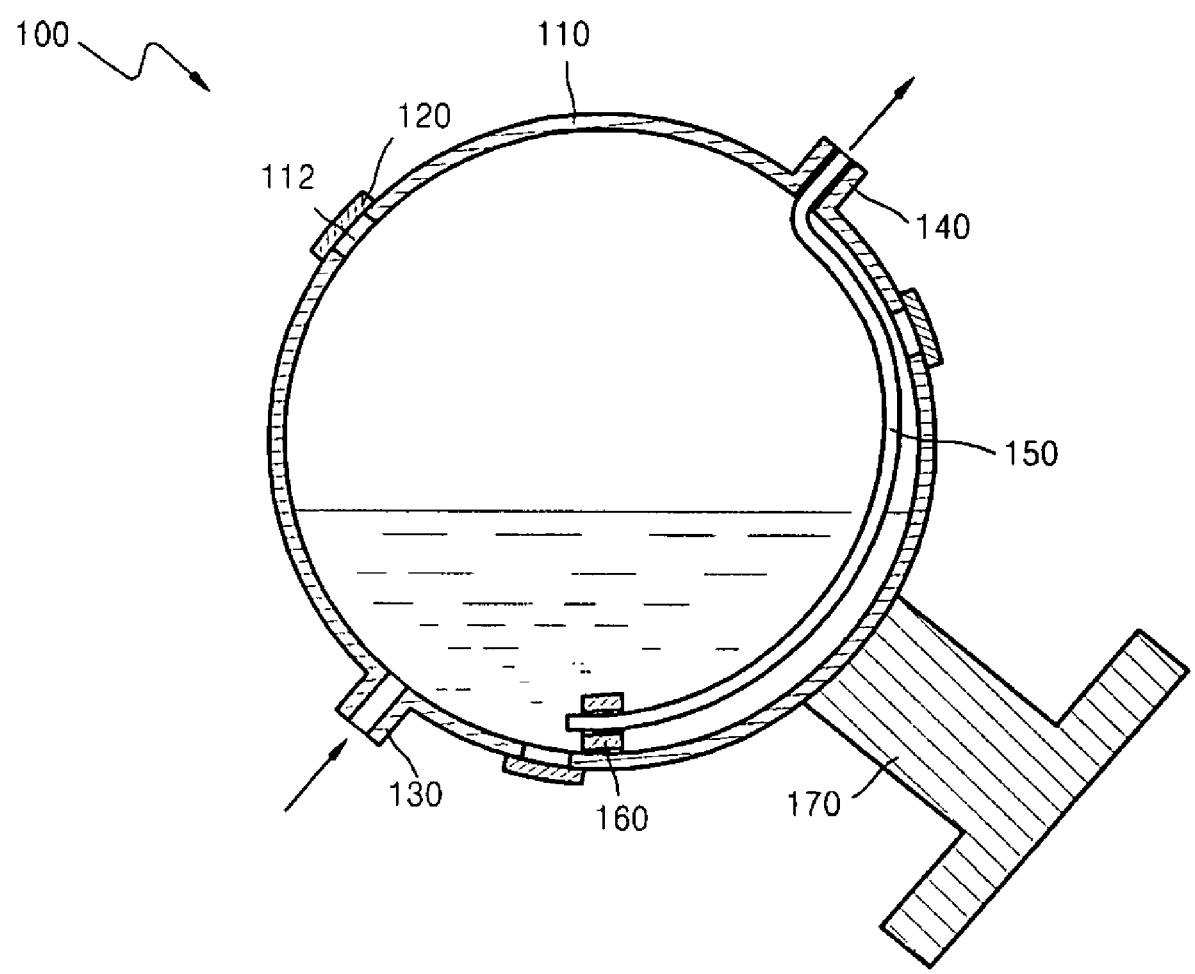
FIG. 5 is a cross-sectional view for explaining the operation of a liquid-gas separator according to an embodiment of the present invention.

FIG. 5 is a cross-sectional view for explaining an operation of a liquid-gas separator according to an embodiment of the present invention.

Referring to FIG. 5, when the liquid-gas separator 100 is inclined and a portion of the main body 110 is filled with liquid entering from the fuel cell, at least one opening 112 is not covered by the liquid. Therefore, carbon dioxide and water vapor entering from the fuel cell are exhausted to the outside through the gas extracting membrane 120 which does not contact the liquid as the gas pressure in the main body 110 increases. Meanwhile, the end of the flexible tube 150 sinks to the lowest position of the main body 110 due to the weight 160, and the liquid fuel passes through the flexible tube 150 and is conveyed to the anode electrode connected to the outlet 140 by the operation of the water pump 191 (refer to FIG. 3).

Figure 6:
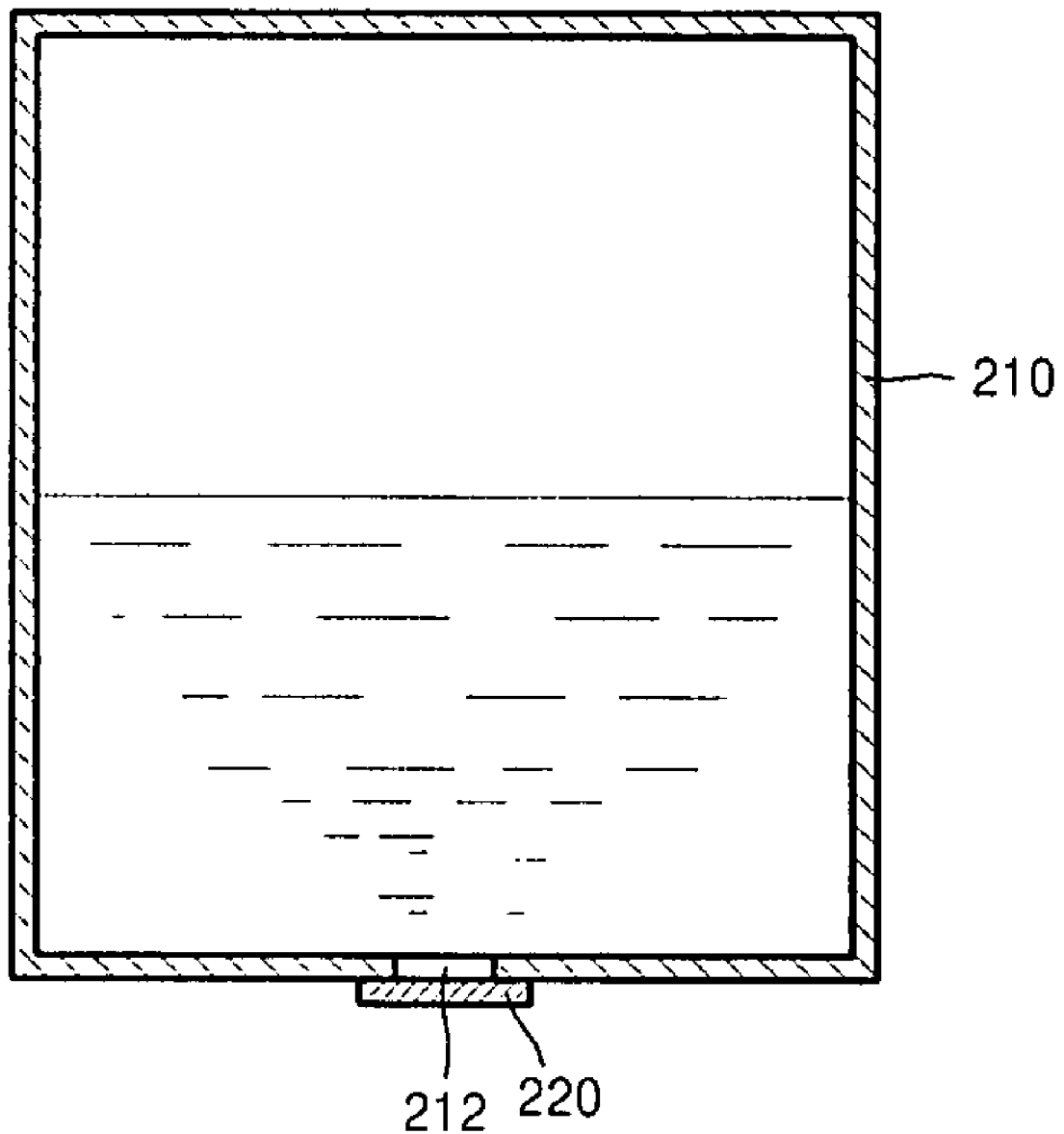
FIG. 6 is a cross-sectional view of an apparatus used for testing the action of a gas extraction membrane in an aspect of the present invention.

FIG. 6 is a cross-sectional view of an apparatus used for testing an operation of a gas extraction membrane 120 in an aspect of the present invention. Referring to FIG. 6, a rectangular opening 212 having dimensions of 3 mm×3 mm is formed in a lower part of a container 210, and a gas extracting membrane 220 formed of hydrophobic PTFE (TEFLON) is attached under the opening 212. The container 210 is filled with methanol at a concentration of 1 M, and the methanol is maintained at a temperature of 80° C. using a heater (not shown). As a result of the test, the methanol is not extracted through the gas extracting membrane 220 formed under the opening 212.

As described above, the liquid-gas separator according to aspects of the present invention separates liquid and gas regardless of the changes in position of a mobile direct liquid feed fuel cell having the liquid-gas separator. Accordingly, a direct liquid feed fuel cell having the liquid-gas separator performs well regardless of the position of the liquid-gas separator.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A liquid-gas separator to receive a liquid and a gas from a direct liquid feed fuel cell and separate the liquid from the gas, comprising:

a hollow ball-shaped main body;

a plurality of gas extraction membranes, which are each attached to an opening in the main body, to selectively extract the gas from the main body;

an inlet in the main body to guide the liquid and the gas into the main body;

an outlet in the main body to guide the liquid to the outside of the main body; and a flexible tube having a hollow structure, one end of which is connected to the outlet and an other end of which contacts the liquid in the main body.

2. The liquid-gas separator of claim 1, wherein the gas extraction membranes and the openings are formed at least at locations corresponding to apexes of a regular polyhedron that contact the outer surface of the main body.

3. The liquid-gas separator of claim 2, wherein the regular polyhedron is a regular tetrahedron.

4. The liquid-gas separator of claim 1, wherein each gas extraction membrane is formed of polytetrafluoroethylene (PTFE).

5. The liquid-gas separator of claim 4, wherein each gas extraction membrane is formed by pressing the PTFE with a porous reinforcing member.

6. The liquid-gas separator of claim 1, further comprising a weight installed at the other end of the flexible tube from the end connected to the outlet.

7. The liquid-gas separator of claim 6, wherein the specific gravity of the weight is greater than 1.

8. The liquid-gas separator of claim 1, wherein a length of the flexible tube is substantially the same as a diameter of the main body.

9. A direct feed fuel cell system comprising:
a fuel cell stack to generate electricity;
a liquid-gas separator to receive an unreacted liquid fuel and a gas product from an electrochemical reaction in the fuel cell stack and to exhaust the gas and deliver the liquid fuel to an anode of the fuel cell stack, the liquid-gas separator comprising:
a hollow ball-shaped main body,
a plurality of gas extraction membranes which are each attached to an opening in the main body, to selectively extract the gas from the main body,
an inlet in the main body to guide the liquid and the gas into the main body,
an outlet in the main body to guide the liquid to the outside of the main body, and
a flexible tube having a hollow structure, one end of which is connected to the outlet and an other end of which contacts the liquid fuel in the main body; and
a fuel tank to hold the liquid fuel for the fuel cell stack.

10. The direct liquid feed fuel cell system of claim 9, further comprising:
a pump to move the liquid fuel to the anode; and
a blower to move air to a cathode of the fuel cell stack.

11. The direct liquid feed fuel cell system of claim 9, wherein the gas extraction membranes and the openings are formed at least at locations corresponding to apexes of a regular polyhedron that contact the outer surface of the main body.

12. The direct liquid feed fuel cell system of claim 11, wherein the regular polyhedron is a regular tetrahedron.

13. The direct liquid feed fuel cell system of claim 9, wherein each gas extraction membrane is formed of polytetrafluoroethylene (PTFE).

14. The direct liquid feed fuel cell system of claim 13, wherein each gas extraction membrane is formed by pressing the PTFE with a porous reinforcing member.

15. The direct liquid feed fuel cell system of claim 9, further comprising a weight installed at the other end of the flexible tube from the end connected to the outlet.

16. The direct liquid feed fuel cell system of claim 15, wherein the specific gravity of the weight is greater than 1.

17. The direct liquid feed fuel cell system of claim 9, wherein a length of the flexible tube is substantially the same as a diameter of the main body.

18. A direct feed fuel cell system comprising:
a fuel cell stack to generate electricity;
a liquid-gas separator to receive an unreacted liquid fuel and a gas product from an electrochemical reaction in the fuel cell stack and to exhaust the gas and deliver the liquid fuel to an anode of the fuel cell stack, the liquid-gas separator comprising:
a hollow main body,
a plurality of gas extraction membranes, which are each attached to an opening in the main body, to selectively extract the gas from the main body,
an inlet in the main body to guide the liquid and the gas into the main body,
an outlet in the main body to guide the liquid to the outside of the main body, and
a flexible tube having a hollow structure, one end of which is connected to the outlet and an other end of which contacts the liquid fuel in the main body; and
a fuel tank to hold the liquid fuel for the fuel cell stack.

19. A liquid-gas separator to receive a liquid and a gas from a direct liquid feed fuel cell and separate the liquid from the gas, comprising:
a hollow main body;
a plurality of gas extraction membranes which are each attached to an opening in the main body, to selectively extract the gas from the main body;
an inlet in the main body to guide the liquid and the gas into the main body;
an outlet in the main body to guide the liquid to the outside of the main body; and
a flexible tube having a hollow structure, one end of which is connected to the outlet and another end of which contacts the liquid in the main body.

* * * * *

UNITED STATES PATENT AND TRADEMARK OFFICE
CERTIFICATE OF CORRECTION

PATENT NO. : 7,700,213 B2 Page 1 of 1
APPLICATION NO. : 11/445332
DATED : April 20, 2010
INVENTOR(S) : Xiaobing Luo et al.

It is certified that error appears in the above-identified patent and that said Letters Patent is hereby corrected as shown below:

Column 5, line 9, change "an other" to --another--;
Column 5, line 47, change "an other" to --another--.

Signed and Sealed this

Twenty-seventh Day of July, 2010

David J. Kappos
*Director of the United States Patent and Trademark Office*